No. 888,826.

PATENTED MAY 26, 1908.

A. O. KOOKEN.
VALVE GAGE.
APPLICATION FILED APR. 15, 1907.

Witnesses.
J. D. Brady
L. D. Leadbetter

Inventor.
A. O. Kooken
Per O. K. Treso
Atty

UNITED STATES PATENT OFFICE.

ALPHA OMEGA KOOKEN, OF IOLA, KANSAS.

VALVE-GAGE.

No. 888,826.  Specification of Letters Patent.  Patented May 26, 1908.

Application filed April 15, 1907. Serial No. 368,257.

*To all whom it may concern:*

Be it known that I, ALPHA OMEGA KOOKEN, a citizen of the United States, residing at Iola, in the county of Allen and State of Kansas, have invented certain new and useful Improvements in Valve-Gages, of which the following is a specification.

My invention relates to improvements in valve gages; and the object of my improvements is to provide improved means for setting valves on gas and steam engines.

Figure 1:
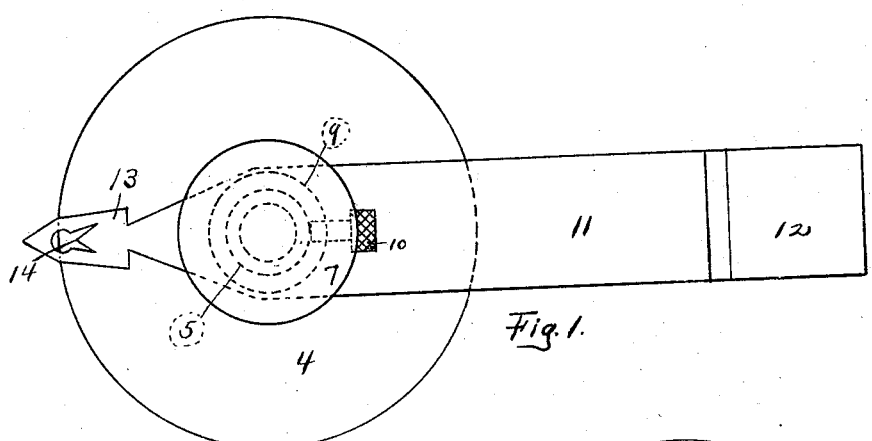
Figure 3:
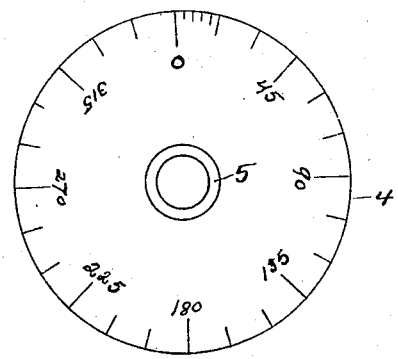
Figure 2:
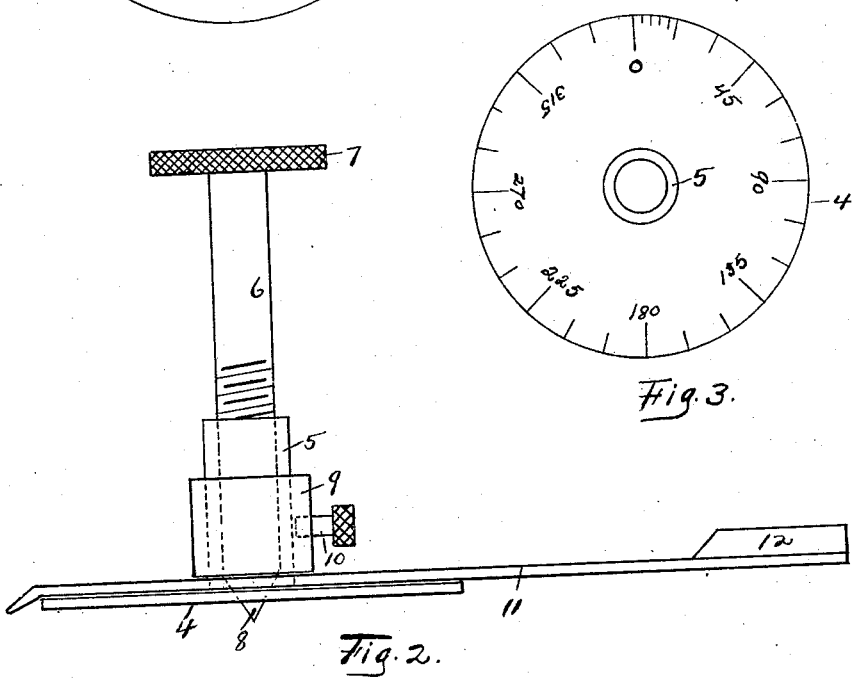

In the drawing—Figure 1 is a top plan view of my improved valve gage; Fig. 2 a side elevation view of same; and Fig. 3 a detail view.

Referring to the drawing in detail—the reference numeral 4 represents a disk or dial having thereon a scale divided into 360 parts, and having an interiorly screw threaded cylindrical hub 5. Adjustably arranged in said hub is a screw bolt 6 having on one end a milled head 7 and at its opposite end a tapered point 8. Surrounding said hub is a collar carrying a set screw 10 for engagement with the said hub. Located between the said collar and dial is a pivotal arm 11 having at one end a weight 12, and provided with an arrow head 13 having therein an opening and having an indicator or point 14 registering with the scale on the dial, and provided with an opening in which the hub 5 is rotatably arranged.

After my improved gage has been assembled in the manner shown and described its operation is as follows: First insert the screw bolt point 8 in the counter-sink in the end of an engine crank shaft with screw bolt 6 in a horizontal position. Next rotate the dial until the indicator 14 points to the zero mark. Then measure the angular distance either way to determine where the valve closes and opens. Having determined this it is an easy matter to determine how far the valve is open at any time.

Having thus described my invention, what I claim as new and desire to secure by Letters Patent, is—

1. In valve gage, a dial having therein a centrally located opening and provided on one side with a cylindrical hub, an arm having an opening to receive the hub, and a bolt adjustably arranged in said hub and having a point adapted to project from the side of the dial opposite the hub for the purpose set forth.

2. In a valve gage, a dial having a central opening and provided on one side with an interiorly screw threaded hub and having on the same side a graduated scale, an arm having an opening fitting said hub and having at one end a weight and provided at its opposite end with an indicating point registering with said scale, a collar surrounding the hub and carrying a set screw for engagement with the hub, and a screw threaded bolt arranged in said hub and having a point for the purpose described.

In testimony whereof I affix my signature in presence of two witnesses.

ALPHA OMEGA KOOKEN.

Witnesses:
 JAMES T. MCMURRAY,
 J. REGINALD SOPHAR.